(12) United States Patent
Mekdad et al.

(10) Patent No.: US 12,505,205 B1
(45) Date of Patent: Dec. 23, 2025

(54) SYSTEMS AND METHODS FOR DETECTING MALICIOUS WEBASSEMBLY MODULES UNDER SOURCE CODE OBFUSCATION

(71) Applicants: Yassine Mekdad, Miami, FL (US); Selcuk Uluagac, Miami, FL (US); Abbas Acar, Miami, FL (US)

(72) Inventors: Yassine Mekdad, Miami, FL (US); Selcuk Uluagac, Miami, FL (US); Abbas Acar, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 19/264,635

(22) Filed: Jul. 9, 2025

(51) Int. Cl.
*G06F 21/00* (2013.01)
*G06F 8/41* (2018.01)
*G06F 21/54* (2013.01)
*G06F 21/56* (2013.01)

(52) U.S. Cl.
CPC .............. *G06F 21/54* (2013.01); *G06F 8/436* (2013.01); *G06F 21/564* (2013.01)

(58) Field of Classification Search
None
See application file for complete search history.

(56) References Cited

U.S. PATENT DOCUMENTS

| | | | | |
|---|---|---|---|---|
| 11,423,146 B2* | 8/2022 | Li | ................ | G06F 18/2413 |
| 11,436,327 B1* | 9/2022 | Vashisht | ................ | G06F 21/54 |
| 11,514,162 B1* | 11/2022 | Sevcenko | ................ | G06F 21/566 |
| 11,574,053 B1* | 2/2023 | Chen | ................ | G06F 21/564 |
| 2007/0039048 A1* | 2/2007 | Shelest | ................ | G06F 21/566 726/22 |
| 2022/0327207 A1* | 10/2022 | Turbin | ................ | G06F 21/568 |
| 2023/0185915 A1* | 6/2023 | Rao | ................ | G06F 21/564 726/22 |
| 2023/0195896 A1* | 6/2023 | Samuel | ................ | G06F 21/53 726/11 |

(Continued)

OTHER PUBLICATIONS

Komiya, Chika et al. Jabberwock: A Tool for WebAssembly Dataset Generation towards Malicious Website Detection. 2023 53rd Annual IEEE/IFIP International Conference on Dependable Systems and Networks Workshops (DSN-W). https://ieeexplore.ieee.org/stamp/stamp.jsp?tp=&arnumber=10207091 (Year: 2023).*

(Continued)

*Primary Examiner* — Jeremiah L Avery
(74) *Attorney, Agent, or Firm* — SALIWANCHIK, LLOYD & EISENSCHENK

(57) ABSTRACT

Systems, methods, and frameworks for detecting malicious WebAssembly (Wasm) modules under source code obfuscation are provided. The system is configured to accurately identify malicious behavior in Wasm modules irrespective of the specific malicious functionality and in the presence of source code obfuscation techniques. The detection process leverages a Vision Transformer (ViT) model to classify a Wasm module as benign or malicious, enabling robust identification of threats across diverse attack patterns. The system operates with substantially low runtime overhead on computing resources, making it suitable for integration into real-time web application environments.

20 Claims, 11 Drawing Sheets

(56) References Cited

U.S. PATENT DOCUMENTS

| | | | | |
|---|---|---|---|---|
| 2023/0267207 A1* | 8/2023 | Smith | ................... | G06F 21/554 |
| | | | | 726/23 |
| 2024/0169056 A1* | 5/2024 | Braggs | .................. | G06F 21/565 |
| 2024/0220616 A1* | 7/2024 | Benameur | ............. | G06F 21/562 |
| 2024/0291863 A1* | 8/2024 | Cohen | ................. | H04L 63/1425 |
| 2024/0378285 A1* | 11/2024 | Lim | ...................... | G06F 21/552 |
| 2025/0028825 A1* | 1/2025 | Kim | ...................... | G06F 21/552 |
| 2025/0259165 A1* | 8/2025 | Kobel | ................ | G06Q 20/3829 |

OTHER PUBLICATIONS

Almurshid, Hadeel A. A Holistic Intelligent Cryptojacking Malware Detection System. IEEE Access, vol. 12. https://ieeexplore.ieee.org/stamp/stamp.jsp?tp=&arnumber=10738793 (Year: 2024).*

Mani, Ganapathy et al. Malware Speaks! Deep Learning Based Assembly Code Processing for Detecting Evasive Cryptojacking. IEEE Transactions on Dependable and Secure Computing, vol. 21, Issue: 4. https://ieeexplore.ieee.org/stamp/stamp.jsp?tp=&arnumber=10226222 (Year: 2023).*

Kim, Minseo et al. Avengers, Assemble! Survey of WebAssembly Security Solutions. 2022 IEEE 15th International Conference on Cloud Computing (CLOUD). https://ieeexplore.ieee.org/stamp/stamp.jsp?tp=&arnumber=9860829 (Year: 2022).*

* cited by examiner (a) Training and validation accuracy (c) ROC curve (b) Training and validation loss (d) Confusion matrix

| Dataset | Type | # Samples | Language | Description |
|---|---|---|---|---|
| JS150K | Benign | 149 677 | JavaScript | 150000 benign JavaScript files gathered from SRILAB ETH Zurich |
| Hynek Petrak | Malicious | 39 453 | JavaScript | A collection of 40 000 JavaScript malware samples |
| Wasm-applications | Benign | 228 | C/C++ | Source of unique open-source C/C++ based Wasm applications |
| Cryptojackers | Malicious | 20 | C/C++ | Source of unique cryptojackers designed for Wasm-based applications |

FIG. 8

| Datasets | Source Code | Nature | Obfuscated | # Generated Samples | Datasets proportion |
|---|---|---|---|---|---|
| JS150K | JavaScript | Benign | No | 1370 | 14.74% |
| JS150K | JavaScript | Benign | Yes | 1361 | 14.65% |
| Hynek Petrak | JavaScript | Malicious | No | 1355 | 14.59% |
| Hynek Petrak | JavaScript | Malicious | Yes | 1385 | 14.93% |
| Wasm-applications | C/C++ | Benign | No | 1002 | 10.80% |
| Wasm-applications | C/C++ | Benign | Yes | 1332 | 14.34% |
| Cryptojackers | C/C++ | Malicious | No | 1058 | 11.40% |
| Cryptojackers | C/C++ | Malicious | Yes | 463 | 4.99% |

FIG. 9

| Performance metrics | WASMGUARD | MINOS |
|---|---|---|
| Accuracy | 98.79% | 77.18% |
| Precision | 98.15% | 56.36% |
| Sensitivity | 99.41% | 12.44% |
| F-1 Score | 98.77% | 77.68% |
| Specificity | 53.65% | 59.89% |
| Negative Predictive Value (NPV) | 99.49% | 89.68% |

FIG. 10

| Detector | WASMGUARD | ClamAV | Malwasm | MinerRay | MineSweeper | VirusTotal |
|---|---|---|---|---|---|---|
| Detection time (s) | 3.78 | 88.39 | 1031.90 | 3264.72 | 3390.18 | 1150.34 |
| Detection rate (%) | 97.53 | 0 | 67.28 | 71.86 | 75.02 | 5.97 |
| CPU usage (%) | 5.22 | 26.6 | 29.95 | 40.81 | 47.93 | 27.18 |
| RAM usage (%) | 3.70 | 65.3 | 68.03 | 72.06 | 77.32 | 58.26 |
| RAM size (MBytes) | 469 | 5875.59 | 7236.95 | 6359.29 | 6781.43 | 1267.73 |

FIG. 11

SYSTEMS AND METHODS FOR DETECTING MALICIOUS WEBASSEMBLY MODULES UNDER SOURCE CODE OBFUSCATION

GOVERNMENT SUPPORT

This invention was made with government support under 2428696 awarded by the National Science Foundation. The government has certain rights in the invention.

BACKGROUND

WebAssembly (Wasm) has emerged as a paradigm shift in web development, providing performance-enhancing capabilities for web applications. Wasm is designed as a compilation target for high-level programming languages and is supported by approximately 97.46% of widely used modern browsers and platforms, including Firefox, Chrome, and Opera, as of January 2025. Due to its growing adoption, malicious actors have exploited this technology by distributing malware embedded in Wasm modules, which execute on the client side. However, existing methods and tools for detecting malicious Wasm modules are inadequate, as they are typically limited to detecting specific malware types, depend on availability of source code, or fail to address obfuscation techniques employed to evade detection.

BRIEF SUMMARY

Embodiments of the subject invention address the shortcomings of existing defense mechanisms against malicious WebAssembly (Wasm) modules, as discussed in the Background, by providing novel and advantageous systems and methods for detecting malicious Wasm modules under source code obfuscation.

In an embodiment, a system for detecting malicious Wasm modules under source code obfuscation can comprise: a processor; and a machine-readable medium in operable communication with the processor and having instructions stored thereon that, when executed by the processor, perform the following steps: a) collecting source code written in a computer programming language (e.g., JavaScript, C, C++, or any combination thereof) that is designed for Wasm applications; b) categorizing the collected source code written in the computer programming language into a benign category and a malicious category based on predefined labeling criteria; c) preprocessing the benign and malicious source code written in the computer programming language to generate four distinct categories of binary code comprising: a benign non-obfuscated binary code, a benign obfuscated binary code, a malicious non-obfuscated binary code, and a malicious obfuscated binary code; d) constructing a balanced dataset by selecting an equal (or a substantially equal (e.g., within 10% of each other)) number of samples from each of four distinct binary code categories; e) splitting the balanced dataset into a training dataset, a validation dataset, and a test dataset using stratified sampling to preserve class proportions in each respective dataset; f) training a machine learning (ML) model using the training dataset, thereby generating a trained ML model configured to output a classification label indicative of whether input data is benign or malicious; g) selecting a model configuration comprising a hyperparameter set including a learning rate, a number of training epochs, and/or a batch size, the selected configuration yielding optimal performance when evaluated on the validation dataset; h) performing a final evaluation of the trained ML model using the test dataset; i) receiving a Wasm module within a user's browser environment; j) applying the trained ML model to the received Wasm module to generate a classification label indicative of whether the received Wasm module is benign or malicious; k) triggering an alert mechanism responsive to a classification of the received Wasm module as malicious, the alert mechanism being configured to inform the user of the potential threat, the alert comprising information related to the malicious Wasm module and an origin identifier associated with the corresponding website; and l) relocating the malicious Wasm module into a secure isolation environment configured to prevent or inhibit the malicious Wasm module from interacting with the remainder of the browsing environment. Step c) can comprise using the following components: (A) an obfuscator; (B) a converter; and/or (C) a validator. Using component (A) can comprise: (A1) receiving source code as input; (A2) performing semantic-preserving code transformations on the source code using a plurality of obfuscation techniques, the transformations being configured to retain the original semantics while increasing code complexity; and (A3) generating obfuscated source code as output. Using component (B) can comprise: (B1) receiving, as input, either the obfuscated source code processed by component (A), or the non-obfuscated source code obtained from step b); (B2) compiling the received source code into a Wasm module conforming to the Wasm specification; and (B3) outputting compiled Wasm module. Using component (C) can comprise: (C1) receiving the compiled Wasm module as input; applying a validation algorithm in accordance with the Wasm specification; (C2) verifying that the compiled Wasm module is well-formed and conforms to structural and semantic rules defined by the Wasm language; and (C3) generating a validation result indicative of whether the compiled Wasm module is valid. Step c) can further comprise the sub-steps of: c1) applying an undersampling technique comprising random selection to the JavaScript source code to reduce the number of the JavaScript source code in overrepresented categories of dataset; and c2) applying an oversampling technique comprising data augmentation to the binary code compiled from C, C++, or a combination thereof to improve class balance within the dataset by increasing the representation of underrepresented categories. The ML model used in step f) comprising a Vision Transformer (ViT) model. The instructions, when executed, can further perform the following steps, prior to step f): (i) converting each of the four distinct categories of binary code, each representing a Wasm module, into corresponding image representation suitable for input into the ViT model; (ii) resizing the image representation of the binary code into a fixed resolution of 224× 224 pixels; (iii) converting the resized image to a grayscale channel to reduce dimensional complexity and standardize input channels for subsequent processing; and/or (iv) replicating the grayscale channel three times to construct a three-channel image compatible with input requirements of the ViT model. The source code written in the computer programming language used in step c) (if/when malicious) can comprise at least one of cryptominer malware or non-cryptominer malware, the non-cryptominer malware comprising at least one of trojans, downloaders, JavaScript-based ransomware, clickjackers, phishing scripts, or droppers, thereby enabling detection of multiple categories of malicious software. The system can be an in-browser detector configured to analyze the Wasm modules in real time during web application execution and to classify the Wasm module as benign or malicious using static analysis prior to execution.

In another embodiment, a method for detecting malicious Wasm modules under source code obfuscation can comprise: a) collecting source code written in a computer programming language (e.g., JavaScript, C, C++, or any combination thereof) that is designed for Wasm applications; b) categorizing the collected source code written in the computer programming language into a benign category and a malicious category based on predefined labeling criteria; c) preprocessing the benign and malicious source code written in the computer programming language to generate four distinct categories of binary code comprising: a benign non-obfuscated binary code, a benign obfuscated binary code, a malicious non-obfuscated binary code, and a malicious obfuscated binary code; d) constructing a balanced dataset by selecting an equal (or a substantially equal (e.g., within 10% of each other)) number of samples from each of four distinct binary code categories; e) splitting the balanced dataset into a training dataset, a validation dataset, and a test dataset using stratified sampling to preserve class proportions in each respective dataset; f) training an ML model using the training dataset, thereby generating a trained ML model configured to output a classification label indicative of whether input data is benign or malicious; g) selecting a model configuration comprising a hyperparameter set including a learning rate, a number of training epochs, and/or a batch size, the selected configuration yielding optimal performance when evaluated on the validation dataset; h) performing a final evaluation of the trained ML model using the test dataset; i) receiving a Wasm module within a user's browser environment; j) applying the trained ML model to the received Wasm module to generate a classification label indicative of whether the received Wasm module is benign or malicious; k) triggering an alert mechanism responsive to a classification of the received Wasm module as malicious, the alert mechanism being configured to inform the user of the potential threat, the alert comprising information related to the malicious Wasm module and an origin identifier associated with the corresponding website; and l) relocating the malicious Wasm module into a secure isolation environment configured to prevent or inhibit the malicious Wasm module from interacting with the remainder of the browsing environment. Step c) can comprise using the following components: (A) an obfuscator; (B) a converter; and/or (C) a validator. Using component (A) can comprise: (A1) receiving source code as input; (A2) performing semantic-preserving code transformations on the source code using a plurality of obfuscation techniques, the transformations being configured to retain the original semantics while increasing code complexity; and (A3) generating obfuscated source code as output. Using component (B) can comprise: (B1) receiving, as input, either the obfuscated source code processed by component (A), or the non-obfuscated source code obtained from step b); (B2) compiling the received source code into a Wasm module conforming to the Wasm specification; and (B3) outputting compiled Wasm module. Using component (C) can comprise: (C1) receiving the compiled Wasm module as input; applying a validation algorithm in accordance with the Wasm specification; (C2) verifying that the compiled Wasm module is well-formed and conforms to structural and semantic rules defined by the Wasm language; and (C3) generating a validation result indicative of whether the compiled Wasm module is valid. Step c) can further comprise the sub-steps of: c1) applying an undersampling technique comprising random selection to the JavaScript source code to reduce the number of the JavaScript source code in overrepresented categories of dataset; and c2) applying an oversampling technique comprising data augmentation to the binary code compiled from C, C++, or a combination thereof to improve class balance within the dataset by increasing the representation of underrepresented categories. The ML model used in step f) can comprise a ViT model. The method can further comprise, prior to step f): (i) converting each of the four distinct categories of binary code, each representing a Wasm module, into corresponding image representation suitable for input into the VIT model; (ii) resizing the image representation of the binary code into a fixed resolution of 224×224 pixels; (iii) converting the resized image to a grayscale channel to reduce dimensional complexity and standardize input channels for subsequent processing; and/or (iv) replicating the grayscale channel three times to construct a three-channel image compatible with input requirements of the ViT model. The source code written in the computer programming language used in step c) (if/when malicious) can comprise at least one of cryptominer malware or non-cryptominer malware, the non-cryptominer malware comprising at least one of trojans, downloaders, JavaScript-based ransomware, clickjackers, phishing scripts, or droppers, thereby enabling detection of multiple categories of malicious software. The method can be performed utilizing, for example, an in-browser detector configured to analyze the Wasm modules in real time during web application execution and to classify the Wasm module as benign or malicious using static analysis prior to execution. Any or all steps or sub-steps can be performed by a processor.

BRIEF DESCRIPTION OF DRAWINGS

FIG. 6(a) shows clusters of data points located in the top-left region corresponding to the benign class, and clusters located in the bottom-right region correspond to the malicious class. FIG. 6(b) shows groups of data points aligned along the left-side diagonal lines associated with the benign class, whereas groups of data points aligned along the right-side diagonal lines correspond to the malicious class. FIG. 6(c) shows groups of data points located within the inner circle corresponding to the benign class, while groups of data points positioned along the outer circle and within small inner regions correspond to the malicious class.

FIG. 8 shows a table of a summary of collected dataset categorized by type, number of samples, and corresponding source code language.

FIG. 9 shows a table of a summary of data source, types of source code (JavaScript, C, C++, or any combination thereof), class label (benign or malicious), whether obfuscation was applied (yes or no), and overall statistical proportions within the entire dataset.

FIG. 10 shows a table of comparative performance metrics including accuracy, precision, sensitivity, F1 score, specificity, and Negative Predictive Value (NPV) with respect to machine learning (ML) detector, MINOS.

FIG. 11 shows a table of comparative evaluation metrics including detection time, detection rate, CPU usage, RAM usage and RAM size with respect to non-ML detectors including ClamAV, Malwasm, MinerRay, MineSweeper, and VirusTotal.

DETAILED DESCRIPTION

Figure 1:
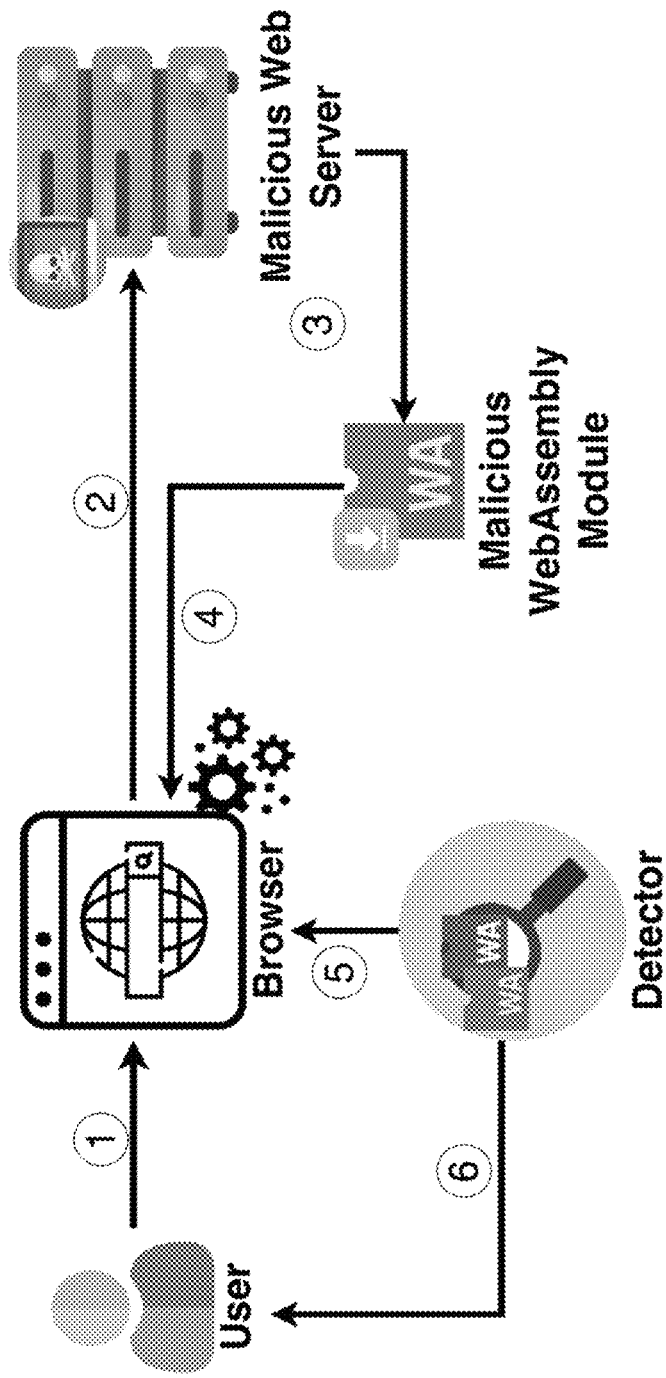
FIG. 1 shows a high-level system overview for detecting malicious WebAssembly (Wasm) modules within a user's browser according to an embodiment of the subject invention.

Embodiments of the subject invention provide novel and advantageous systems and methods for detecting malicious WebAssembly (Wasm) modules under source code obfuscation. An in-browser deep learning-based detector, which can be referred herein as WASMGUARD, for malicious obfuscated Wasm binaries, leverages a Vision Transformer (ViT) model configured to perform binary classification tasks. WASMGUARD utilizes a dataset over 9,000 unique Wasm samples, each generated by compiling both malicious and non-malicious source code written in JavaScript, C, C++, or any combination thereof into Wasm modules. These samples can be obfuscated using semantically preserving code obfuscation techniques (e.g., 135 semantically preserving code obfuscation techniques).

With the advent of the new era of the World Wide Web (Web 3.0), rapid advancements in cutting-edge technologies enable the development of rich client-side web applications executed within web browser. Although these technologies significantly enhance user experience on the web, they concurrently introduce new attack vectors that enable adversaries to execute various client-side attacks, including keylogging, cryptojacking, phishing, and browser privilege escalation. One such advanced technology is Wasm, which has transformed the web ecosystem by enabling the execution of large-scale applications requiring intensive computations, such as 3D games, Photoshop Web, and AutoCAD Web, directly within web browsers. Currently, the vast majority of popular browsers, including Google Chrome, Mozilla Firefox, and Microsoft Edge, provide support for Wasm.

Notably, the increasing popularity and widespread utilization of Wasm-based applications among web users have attracted cybercriminals to develop malicious Wasm modules that execute on the client side. Recent studies have demonstrated the feasibility of employing Wasm for ransomware and cryptojacking attacks. However, owing to its popularity and ease of exploitation by attackers, the threat landscape associated with Wasm extends beyond specific attacks such as ransomware and cryptojacking, as Wasm can be readily employed in diverse forms of malware, including keyloggers and hardware bug exploits. Consequently, the potential risk posed by malicious Wasm modules represents a significant concern for browser security and underscores the need for robust and comprehensive detection and prevention mechanisms.

Prior work has primarily focused on investigating security risks associated with Wasm and detecting Wasm-based malware limited to specific types, such as cryptojacking. The detection strategies employed including static, dynamic, and hybrid analysis approaches exhibit several limitations. First, existing methods predominantly target cryptojacking attacks by utilizing cryptojacking specific features such as Wasm signatures, elevated CPU usage, or hash-based profiling, reflecting the prominence of such threats in recent years. Consequently, these methods fail to address other malicious uses of Wasm, including ransomware, trojans, and keyloggers. Second, many current detectors depend on source code analysis, for example, JavaScript-based detection, which proves ineffective against Wasm malware due to feature transformation and obfuscation introduced during compilation. Third, existing strategies do not adequately account for potential obfuscation techniques employed by adversaries, which can conceal malicious code functionality and thus undermine traditional detection mechanisms. In summary, current detection approaches are insufficient for comprehensive identification of malicious Wasm usage across the web.

To address the limitations of existing approaches in detecting diverse and obfuscated malicious uses of Wasm across the web, WASMGUARD, a novel and practical end-to-end detection framework can effectively and efficiently identify malicious Wasm modules irrespective of the associated malicious functionality and despite the presence of code obfuscation. In building WASMGUARD, the main challenge lies in identifying the nature of Wasm module (i.e., benign or malicious, obfuscated or non-obfuscated) given its limited availability. On the other hand, since the Wasm modules already contain pre-compiled code by third parties, accessing the source code might not be possible, especially when dealing with proprietary code. Moreover, it is quite challenging for security researchers to harvest a large collection of malicious real-world source code that can be compiled into Wasm modules (e.g., JavaScript, C, C++, or any combination thereof). For these reasons and given the limited diversity of malicious source code, source code written in JavaScript, C, C++, or any combination thereof are selected as the most representative target languages given their prevalence in the malicious Wasm domain.

Embodiments of the subject invention provide at least the following advantages: (1) high detection accuracy; (2) resilience against obfuscation; (3) real-time detection; and (4) platform independence. With respect to high detection accuracy, WASMGUARD achieves a high detection accuracy of 98.79% with F1 score of 98.77%. Furthermore, WASMGUARD has been cross-validated using the stratified k-fold cross-validation technique, and demonstrates an average precision rate of 98.12%, thereby showing a promising overall performance without inducing overfitting or data bias. With respect to resilience against obfuscation, while current obfuscation techniques pose significant challenges to traditional detection approaches, WASMGUARD considers 135 semantically preserving obfuscation techniques at the source code level in JavaScript, C, C++, or any combination thereof. With respect to real-time detection, WASMGUARD has a very low runtime overhead when compared to other detection approaches. WASMGUARD demonstrates outstanding performance, with low computational and memory overhead. WASMGUARD has been trained with more than 9,000 unique samples and can detect 832 malicious Wasm modules in just 3.78 seconds. With respect to platform independence, WASMGUARD is compatible with any browser that supports Wasm. It can be implemented as a plugin within the browser to provide real-time detection.

FIG. 1 illustrates a high-level overview of WASMGUARD system within a user's browser. During Internet browsing via a user-preferred browser (e.g., Mozilla Firefox, Google Chrome, Microsoft Edge) in Step 1, the user accesses a potentially malicious web server hosting a web application in Step 2. Assuming the user is unaware of the malicious nature of the web server and no detection or prevention mechanisms are in place, the web server delivers a malicious Wasm binary as part of the web application in Step 3. Upon user interaction with the web application, the malicious Wasm module is automatically downloaded into the user's browser environment in Step 4. Prior to execution, WASMGUARD performs a scan of the Wasm binary to determine the nature of the code as either benign or malicious in Step 5. WASMGUARD detection time is comparatively fast, on the order of milliseconds, enabling real-time handling of user-to-browser interactions. Upon identification of the Wasm module as malicious, WASMGUARD triggers an alert, and the user is directly notified in Step 6. The alert may comprise information regarding the malicious Wasm module and the origin of the associated website. Subsequently, WASMGUARD relocates the malicious Wasm module into a secure isolation environment to prevent or inhibit interaction with the remainder of the browsing environment.

In an embodiment, the framework of the system and method can include a data preprocessing strategy and a deep learning network architecture such as:

1) Bytecode preprocessing: According to the technical specifications of Wasm, a Wasm module consistently comprises a low-level bytecode format, irrespective of its nature or functionality. Although various code transformations may be applied at the source code level to obfuscate benign or malicious samples, the Wasm module is invariably representable as a sequence of hexadecimal digits that encode specific instructions and parameters of the module. To that end, WASMGUARD parses the Wasm binary into sequences of hexadecimal, and group them into fixed-sized segments. This would preserve the integrity of the Wasm binary. Afterwards, WASMGUARD maps each segment to a grayscale representation format. The grayscale representation preserves the raw structure of the Wasm binary which is less computationally expensive compared to the RGB representation.

2) Architectural design: WASMGUARD's inner architecture is based on a class of transformers referred to as a ViT model. The ViT model has gained attraction and popularity as promising alternative to traditional Convolutional Neural Network (CNN). The ViT model is particularly used for image processing, given its high capabilities of capturing long-range dependencies across the images without constraints on the local receptive fields. Moreover, the ViT model has been widely used across different fields due to its high detection accuracy and performance. For these reasons, WASMGUARD implements the VIT model, which is derived from the transformer architecture that can automatically learn and extract features without relying on convolutional operations, thereby reducing potential bias. WASMGUARD processes images as sequences of patches, enabling independent analysis and processing of each individual patch. To increase the input efficiency for WASMGUARD, Wasm binaries are converted into sequences of images and fed into a ViT model. The rationale for employing the ViT model lies in the reduced network architecture complexity, as the ViT model eliminates the requirement for manually designed convolutional layers and instead utilizes self-attention mechanisms to capture global contextual information. While prior work in the domain has employed image-based CNN detection methods, such approaches introduce biases associated with image-specific operations. Furthermore, CNNs lack inherent mechanisms for encoding positional information of spatial features, limiting effectiveness in capturing global structural dependencies.

The data preprocessing strategy comprises data acquisition process and data construction process.

Data Acquisition: Although a substantial number of datasets may be collected to construct a sufficiently large training dataset for Wasm binaries, the initial determination of the nature of such binaries, i.e., whether they are benign or malicious, obfuscated or non-obfuscated, remains challenging in the absence of access to the corresponding source code. Accordingly, efficient machine learning (ML)-based detection of malicious Wasm modules should rely on trusted samples obtained during the data collection phase. Benign and malicious source code samples intended for Wasm applications may be manually collected to ensure the reliability of the training dataset as depicted in FIG. 8. Then, the benign and malicious source code samples can be converted into Wasm binaries. Given the limited availability of malicious source code for C, C++, or a combination thereof languages, data augmentation techniques can be considered to obtain a balanced and diversified dataset for the training dataset. Data augmentation creates variants of the same Wasm binary. However, data augmentation for obfuscated Wasm modules might be considered as a sort of obfuscation. This scenario is considered only for a few samples, while the remaining samples are obfuscated at the source code level. WASMGUARD is trained using over 9,000 diverse and comprehensive Wasm samples that contain four categories of Wasm binaries:

Benign non-obfuscated samples: These are benign Wasm binaries that have neither been obfuscated nor subjected to code transformations at the source code level. Such samples represent the most commonly available form of Wasm binaries.

Benign obfuscated samples: This category comprises benign Wasm binaries that have undergone various obfuscation techniques applied at the source code level. Although acquiring samples within this category presents challenges, a range of obfuscation methods may nonetheless be applied to Wasm applications based on JavaScript, C, C++, or any combination thereof. The resulting obfuscated source code may then be compiled into the corresponding Wasm binaries.

Malicious non-obfuscated samples: This category comprises malicious Wasm binaries generated from source code that does not incorporate any obfuscation techniques. These samples represent unique malware based on JavaScript, C, C++, or any combination thereof, specifically designed for Wasm applications. The category of malicious non-obfuscated source code samples includes, but is not limited to, trojans, downloaders, cryptominers, JavaScript-based ransomware, clickjackers, phishing scripts, and droppers. The malicious non-obfuscated samples are collected from real-world sources and have been identified as such by widely recognized commercial antivirus (AV) platforms, including VirusTotal.

Malicious obfuscated samples: This category presents the greatest challenge, as it comprises malicious Wasm binaries that have been subjected to obfuscation at the source code level prior to compilation.

Dataset Construction: The labeled Wasm modules dataset from source code written in JavaScript, C, C++, or any combination thereof can be constructed. First, the collected source code of benign and malicious samples might have a class imbalance issue. This could be explained by the limited availability of benign and malicious C, C++, or a combination thereof samples that are designed for Wasm applications. In this case, a balanced training dataset of Wasm modules can be constructed (i.e., benign obfuscated, benign non-obfuscated, malicious obfuscated, and malicious non-obfuscated) by:

Undersampling via random selection of a subset of the JavaScript samples per category at the source code level.

Oversampling the C, C++, or a combination thereof samples via data augmentation techniques at the binary level.

Figure 3:
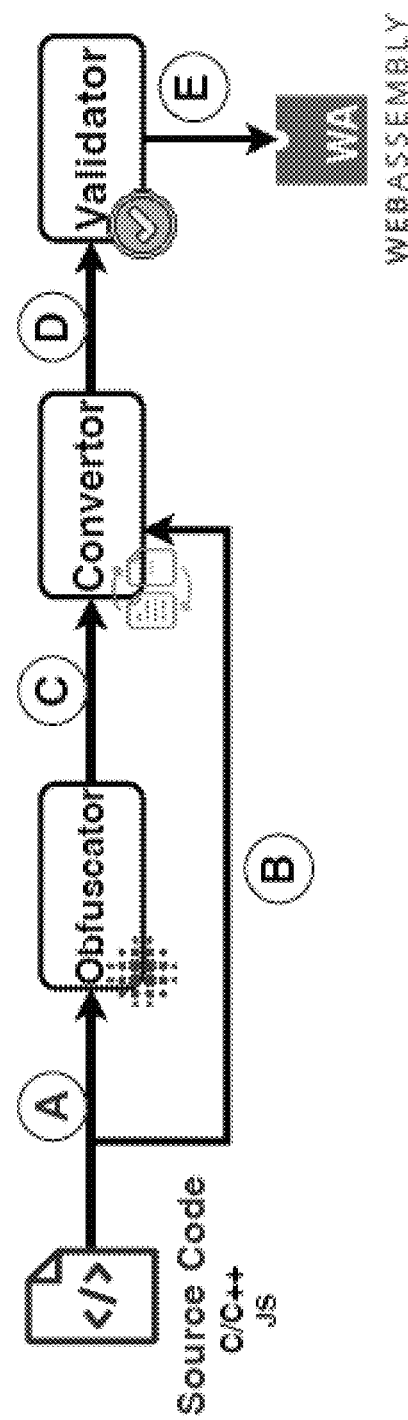
FIG. 3 shows data obfuscation, conversion, and validation strategy.

Using the data preprocessing strategy, the batch size fed into WASMGUARD's model has a balanced number of benign and malicious Wasm modules in each subcategory (i.e., obfuscated and non-obfuscated). FIG. 3 illustrates an overall workflow of the dataset construction. The dataset construction comprises three components: an obfuscator, a converter, and a validator.

Obfuscator: Given a source code as input, the obfuscator performs semantic-preserving code transformations and gives the obfuscated source code as output. Tigress is utilized for obfuscation of source code written in C, C++, or a combination thereof, whereas Wobfuscator is employed for obfuscation of JavaScript source code.

Converter: A valid source code is taken as input by the converter and compiled into a Wasm module. Emscripten is used for source code written in C, C++, or a combination thereof, while Javy is applied for JavaScript source code.

Validator: The validator implements the validation algorithm of the Wasm specification. The validator guarantees that a Wasm module is well-formed and follows the rules defined by the Wasm language. The rules are described either in an intuitive or mathematical form.

Referring to FIG. 3, a total of 2,731 benign JavaScript source code samples are randomly selected. Subsequently, 1,361 benign JavaScript source code samples (representing 49.84% of the entire sample size) are obfuscated using the Wobfuscator in Step A. Afterward, the obfuscated JavaScript source code samples are compiled into Wasm modules through the converter in Step C. Validation is performed on the compiled obfuscated JavaScript source code samples using the validator in Step D. Finally, validated Wasm modules are obtained in Step E. The remaining 1,370 benign JavaScript source code samples are excluded from the obfuscator and are only compiled via the converter in Step B and followed by validation in Step D. A corresponding strategy are applied to the malicious JavaScript source code samples. In this case, 1,355 non-obfuscated malicious JavaScript source code samples and 1,385 obfuscated malicious JavaScript source code samples are included.

Due to the limited availability of collected benign and malicious samples of C, C++, or any combination thereof source code, data augmentation techniques are employed using Wasm-Mutate to enhance the dataset. The Wasm-Mutate is an open-source tool that automatically transforms a Wasm binary program into multiple variants that preserve the original functionality, thereby generating tens of thousands of unique and efficient Wasm variants. In this case, given an input Wasm module, the output is a mutated Wasm module that generates comparable outputs when given the same inputs as the original Wasm module. By running Wasm-Mutate continuously over the same samples and removing duplicated ones, approximately 1,000 variants are generated for each category, except for obfuscated malicious samples as depicted in FIG. 9, where most of the generated variants exhibit high similarity.

The number of collected dataset consists of 139,388 source code samples. It includes benign and malicious source code written in JavaScript, C, C++, or any combination thereof from public sources. FIG. 8 shows a summary of the collected dataset categorized by the type, the number of samples, and the corresponding source code language. For the benign samples, JS150K, comprising approximately 149,000 JavaScript samples, is collected, from Secure, Reliable, and Intelligent Systems (SRI) Lab at ETH Zurich. Additionally, a total of 238 benign Wasm applications written in the programming language comprising C, C++, or a combination thereof are collected. For malicious source code, approximately 39,000 JavaScript samples are collected from the Hynek Petrak repository. From this repository, a variety of malicious scripts are gathered, including trojans, downloaders, cryptominers, clickjackers, phishing scripts, and droppers, thereby encompassing a wide range of categories. Despite the limited availability of malicious source code written in C, C++, or a combination thereof, approximately 20 unique cryptojacker samples designed for Wasm applications are collected. Construction of the labeled Wasm modules datasets is thereafter performed. In view of the class imbalance observed among the collected datasets, undersampling of JavaScript source code is performed via random selection, and oversampling of binary code of C, C++, or a combination thereof is conducted using data augmentation techniques. FIG. 9 shows a breakdown of the number of Wasm binaries from each category, including the corresponding original source code prior to compilation, and the overall statistical distribution across the entire dataset. A balanced dataset proportion is observed for each category of the generated Wasm modules. This proportion ranges from 10% to 14%, comprising approximately 1,000 unique samples per category.

Embodiments can employ obfuscation techniques (e.g., 135 obfuscation techniques) that preserve semantic equivalence, ensuring functional behavior remains unchanged after transformation. Obfuscation can be described as a set of functionality-preserving transformations applied to a program to prevent or inhibit the understanding of the code functionality using static analysis tools (e.g., reverse engineering techniques, Control Flow Graph (CFG) analysis). Static analysis refers to the process of analyzing source code or binary code without executing them. In the context of Wasm modules, static analysis comprises inspecting the binary structure, bytecode, or associated metadata of a Wasm module prior to execution within the browser environment. Static analysis provides several technical advantages, including: (i) improved performance by eliminating the need to execute the module during inspection; (ii) enhanced security by avoiding the risk of triggering potentially malicious behavior through execution; (iii) pre-execution threat identification enabling preventive actions such as blocking or isolating the module before it can affect the system; and (iv) platform independence, as static analysis does not require emulation or simulation of the runtime environment in which the code would otherwise execute.

Obfuscation techniques could be applied at either the source code level or the binary level. When applied at the binary level, the transformations are directly performed on the Wasm module without modifying the source code. In such cases, obfuscation of Wasm sections requires a decoding and/or decryption function, which is embedded within the Wasm module and configured to be executed initially. During reverse engineering Wasm binaries obfuscated at the binary level, recover of the original code is facilitated by direct access to the embedded decoding and/or decryption function. Accordingly, obfuscation at the source code level is more effective than obfuscation at the binary level with respect to execution speed and robustness against reverse engineering. The present disclosure focuses on obfuscation techniques applied at the source code level.

Obfuscation of code written in C, C++, or a combination thereof: At the source code level of C, C++, or a combination thereof, a set of code transformations can be applied to the source code by combining manipulations of the control flow and data flow of the program. Afterward, the source code can be compiled into a Wasm module. Tigress is an open-source obfuscator commonly used for the programming language comprising C, C++, or a combination thereof that provides multiple obfuscation techniques to protect against static and dynamic reverse engineering, as well as de-virtualization attacks. Tigress is a source-to-source transformer that considers 32 different obfuscation techniques (i.e., Tigress receives source code written in C, C++, or a combination thereof as input and produces obfuscated source code written in C, C++, or a combination thereof as output). In what follows, the most popular obfuscation techniques for source code written in C, C++, or a combination thereof are presented:

Opaque Predicate: It is a transformation technique relying on a condition or branch (i.e., predicate) assessed as a Boolean value. Boolean values are chosen and known only by the programmer. These values are constructed via data structures with specific invariants that are added to the source code.

Virtualize: It is a transformation that converts a function into an interpreter employing a unique bytecode. During execution, the program interprets each bytecode, resulting in the creation of a virtual machine configured to execute instructions corresponding to each bytecode, thereby performing the original function.

Copy: The copy function duplicates an existing function. When constructed, the copy function might cause the jump table to be allocated in a different space in memory, thus making jump table references challenging to understand.

Encode Literals: This obfuscation technique converts static data to procedural data in which literal integers can be substituted by opaque expressions and literal strings can be replaced by a function that generates them during the execution.

Anti Taint Analysis: This technique hinders dynamic analysis tools that use taint analysis by rewriting the source code to use control flow for variable copying instead of traditional data flow. Example tools are Clang Static Analyzer, Flawfinder, and Cppcheck.

Flatten: It is a code transformation that manipulates the CFG and results in an unstructured control flow.

Anti Alias Analysis: This transformation disrupts static analysis tools that consider inter-procedural alias analysis (e.g., Low Level Virtual Machine (LLVM)/Clang Static Analyzer, Frama-C, SAFE-Code). All direct function calls are replaced with indirect ones to disrupt static analysis tools that perform alias analysis.

Obfuscation of code written in JavaScript: Wobfuscator can be considered as a technique for obfuscating malicious JavaScript code through a set of code transformations that translate the malicious portions of the JavaScript code into Wasm. Wobfuscator identifies the Abstract Syntax Tree (AST) translation nodes where the obfuscation techniques could be applied in a semantic-preserving way. This opportunistic translation has shown its effectiveness by evading the state-of-the-art static detectors. Next, common obfuscation techniques utilized for JavaScript are briefly described:

String Literals Obfuscation: With this transformation, a string literal is replaced with a function call. However, this transformation does not apply to the string laterals that are used in import or require statements.

Arrays Obfuscation: This transformation applies to arrays that have been initialized using numeric literals. Since Wasm only supports numeric data types, the operators .const and .store are used to store numeric literals in memory.

Function Names Obfuscation: This transformation is applied to call expressions or new expressions that reference global functions accessible via the window object. Examples of global functions and objects commonly used in malicious JavaScript code include: eval, escape, unescape, atob, btoa, Function, ActiveXObject, and WScript. Although these capabilities are not malicious, many of the existing JavaScript malware consider them as part of their functionality.

Calls Obfuscation: Call expressions without a return value are targeted in the transformation. Such targeting is feasible because the primitive data types of Wasm (e.g., i32, i64, f32, and f64) are incapable of representing all JavaScript function return values.

If-Statements Obfuscation: This transformation is applied when the JavaScript code sections do not include the keywords break, continue, return, yield, or throw.

For-Loops Obfuscation: The same conditions applied to If-statements obfuscation are also applied to For-loops obfuscation.

While-Loops Obfuscation: A consistent condition with that applied in If-statements and For-loops obfuscation is applied to While-loops obfuscation.

Embodiments of the subject invention employ the ViT model to perform a binary classification task. The goal of the ViT model is to classify the binary samples into two classes: "benign" (type 0) and "malicious" (type 1). In the following, parts of the implementation are described, and key components of the deep learning architecture along with its training process are discussed. In the data preprocessing phase, the constructed dataset with balanced labels including benign non-obfuscated, benign obfuscated, malicious non-obfuscated, and malicious obfuscated samples is loaded and preprocessed. The Wasm binaries can be converted into images. These binaries represent the benign and malicious Wasm modules. After conversion, the images can be resized to a fixed resolution of 224×224 pixels and converted to grayscale format. The grayscale channel can be replicated three times in order to conform to the required input format. The dataset can be then combined into a single list, wherein each input comprises a tuple containing an image and its corresponding label, with 0 indicating benign and 1 indicating malicious. A data partitioning strategy comprising training, validation, and test subsets can be adopted to facilitate model evaluation. The dataset can be divided into training, validation, and test subsets comprising 80%, 10%, and 10% of the dataset, respectively. The pre-trained ViT model can be fine-tuned utilizing the training dataset. Subsequently, the validation dataset can be employed for hyperparameter tuning and model selection, and the test dataset can be utilized for final evaluation of the model's performance.

Figure 2:
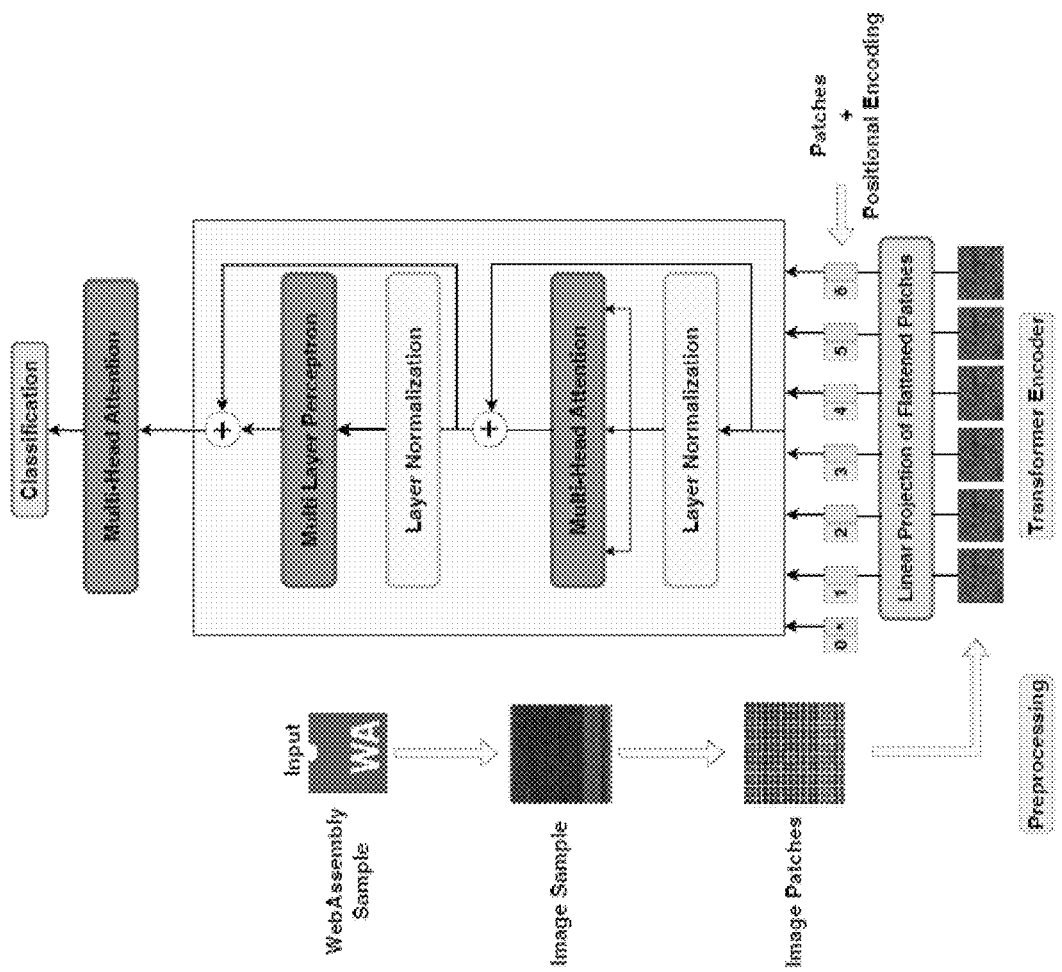
FIG. 2 shows a schematic view of an architecture of a Vision Transformer (ViT) model for detecting malicious Wasm module within the user's browser according to an embodiment of the subject invention.

FIG. 2 illustrates the architecture of the VIT model. The ViT model divides an input image into fixed-size patches (16×16 pixels), which are then linearly embedded and fed into a series of Transformer encoder layers. Each encoder layer comprises multi-head self-attention mechanisms and feed-forward neural networks, followed by layer normalization and residual connections to stabilize the training process. A classification token is appended to the sequence of patch embeddings. The final hidden state corresponding to the classification token is utilized for performing binary classification. The model is configured to output two classes: 'Benign' and 'Malicious'. A binary cross-entropy loss function is utilized to perform the binary classification task. Training is conducted using the AdamW optimizer with a learning rate of $2\times10^{-5}$. A batch size of 8 is set for both training and evaluation. Subsequently, the model was trained for 3 epochs, with evaluation performed at the conclusion of each epoch. Hyperparameter tuning is performed, including adjustment of the learning rate, the number of epochs, and the batch size, to optimize the model's performance.

Embodiments of the subject invention provide a focused technical solution to the focused technical problem of how to detect malicious Wasm modules under source code obfuscation. The solution is provided by WASMGUARD as an in-browser deep learning-based detector for malicious obfuscated Wasm binaries. WASMGUARD leverages the ViT model configured to perform binary classification tasks for distinguishing between benign and malicious Wasm binaries. WASMGUARD encompasses a comprehensive and diverse collection of over 9,000 unique Wasm samples generated by compiling both benign and malicious source code written in JavaScript, C, C++, or any combination thereof into Wasm. Additionally, the source code samples are obfuscated using a comprehensive set of 135 semantically preserving code obfuscation techniques, representing a wide range of transformation strategies to ensure variability, while maintaining functional equivalence. The technical solution provided by embodiments of the subject invention is specific to computer technology, addresses a technical problem within the field of computer technology, and results in improved computer systems by reducing resource abuse on the user's device including slowdowns and system unresponsiveness. Embodiments of the subject invention have the focused, technologically-specific practical application of removing or decreasing malicious obfuscated Wasm binaries on computer systems.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

When the term module is used herein, it can refer to software and/or one or more algorithms to perform the function of the module; alternatively, the term module can refer to a physical device configured to perform the function of the module (e.g., by having software and/or one or more algorithms stored thereon).

When ranges are used herein, combinations and subcombinations of ranges (including any value or subrange contained therein) are intended to be explicitly included. When the term "about" or "approximately" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Materials and Methods

The experimental evaluation was performed on a MacBook Pro computing device equipped with an Apple M1 chip, operating on macOS version 13.4.1, and configured with an 8-core central processing unit (CPU) comprising 6 performance cores and 2 efficiency cores, a 14-core graphics processing unit (GPU), and 16 gigabytes (GB) of RAM. The application was implemented using Python version 3.9 and is configured to be compatible with any web browser that supports Wasm.

Example 1

Figure 4A:
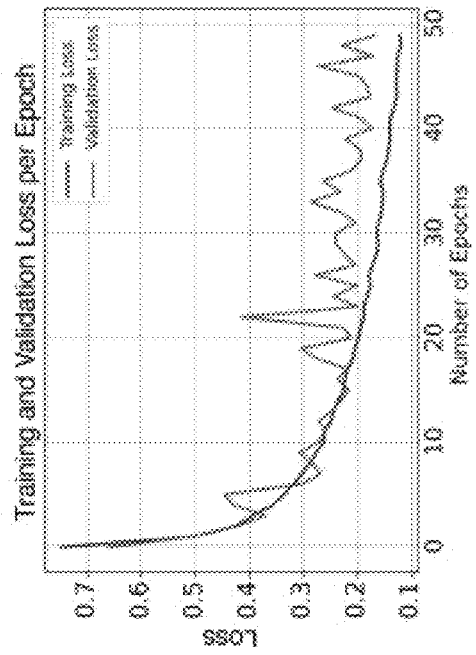
FIGS. 4(a)-4(d) show performance metrics, including training accuracy, validation accuracy, training loss, and validation loss, Receiver Operating Characteristic (ROC) curve, and confusion matrix.
Figure 4B:
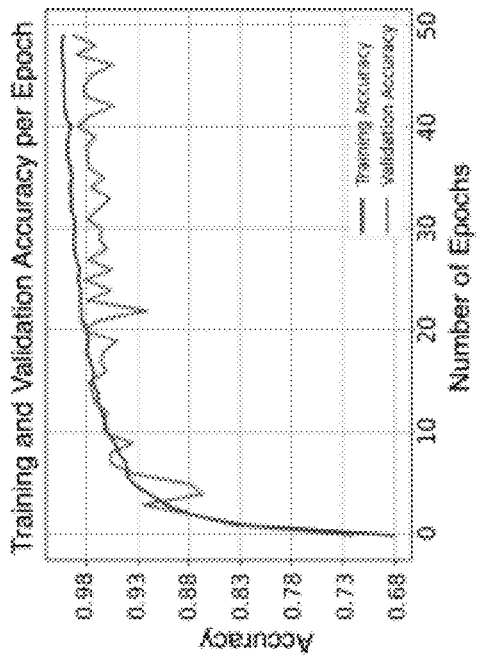
Figure 4C:
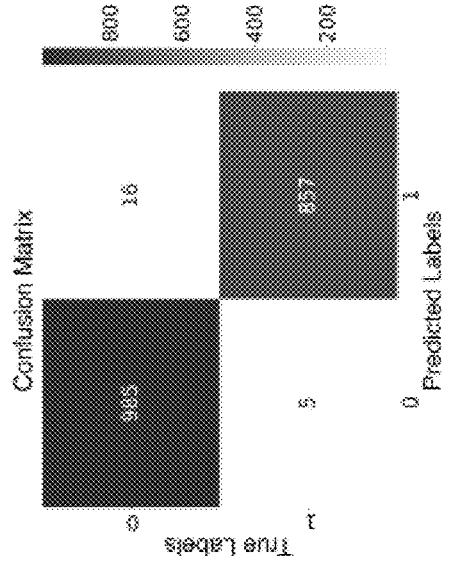
Figure 4D:
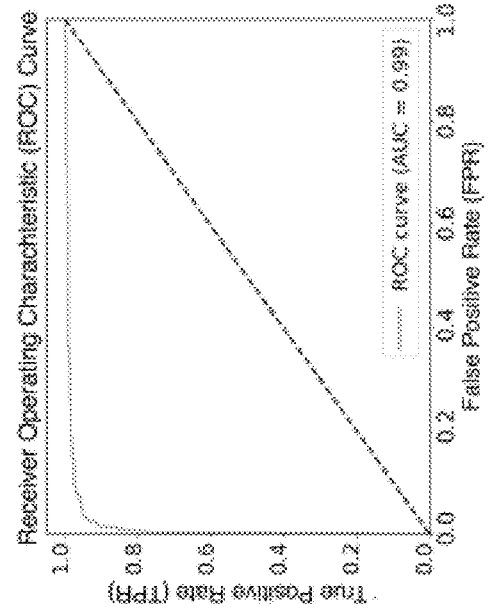

To evaluate the model, various classification metrics were computed, including accuracy, precision, recall, F1 score, confusion matrix, and Receiving Operating Characteristic (ROC) curve as illustrated in FIGS. 4(a)-(d). These metrics provide insights into the model's performance in distinguishing between benign and malicious samples. WASMGUARD was evaluated on the test dataset. FIG. 4(a) shows that the model converges to 97% accuracy after 45 epochs. The learning curve in FIG. 4(b) shows that the validation loss per epoch slowly decreases compared to the training loss. This can be explained by a small overfitting of the model due to the limited availability of samples. However, the ROC curve illustrated in FIG. 4(c) is 0.99, which means that our classifier can ideally distinguish benign and malicious samples even in the presence of minor model overfitting. Additionally, as depicted in FIG. 4(d), the confusion matrix shows the predicted true positive labels of 857 and the true negative labels of 985, while the false positive labels and false negative labels remain at 16 and 5, respectively.

Example 2

Figures 5A, 5B:
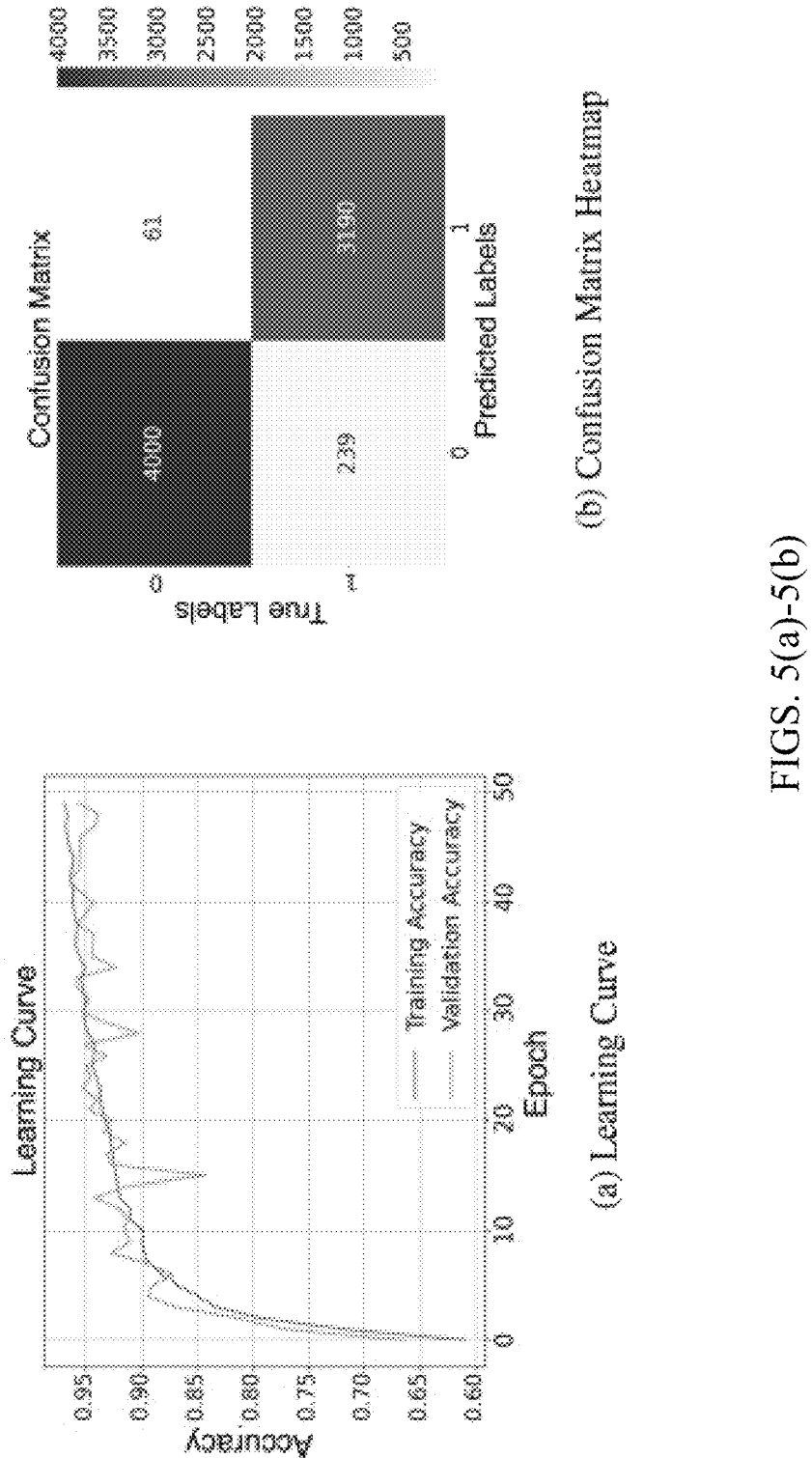
FIGS. 5(a)-5(b) show visual representation of learning curve and confusion matrix heatmap from 10-fold cross-validation.

To guarantee a balanced fold proportion among different classes, due to the presence of obfuscation in both benign and malicious samples within the dataset, 10-fold cross-validation was utilized via the Stratified K-Fold Cross Validation technique. This would generalize the model and avoid performance issues such as overfitting and data bias. Each k-fold has a similar distribution to the original dataset. Initially, the model was compiled. Subsequently, for each fold in the cross-validation process, training was conducted utilizing the validation subset, followed by computation of evaluation metrics, including accuracy, precision, recall, and F1 score. By aggregating the true labels and predicted labels obtained from each fold, an average value of the evaluation metrics was computed across all folds. An average accuracy of 96.43% and an average precision of 98.12% were achieved, as depicted in FIGS. 5(a)-(b). This precision is very similar to the precision found in the original trained model. Therefore, indicating a consistency and stability of WASMGUARD across different subsets of the training datasets. An average recall of 93.03% was obtained, while the F1 score remained at 95.50%. As shown in FIG. 5(b), the learning curve shows a time-evolving performance, suggesting that WASMGUARD can correctly classify malicious samples. Moreover, the confusion matrix heatmap in FIG. 5(a) demonstrates high true positive and true negative values. Thus, WASMGUARD has a generalization capability and can be considered for practical deployments.

Example 3

Figures 6A, 6B:
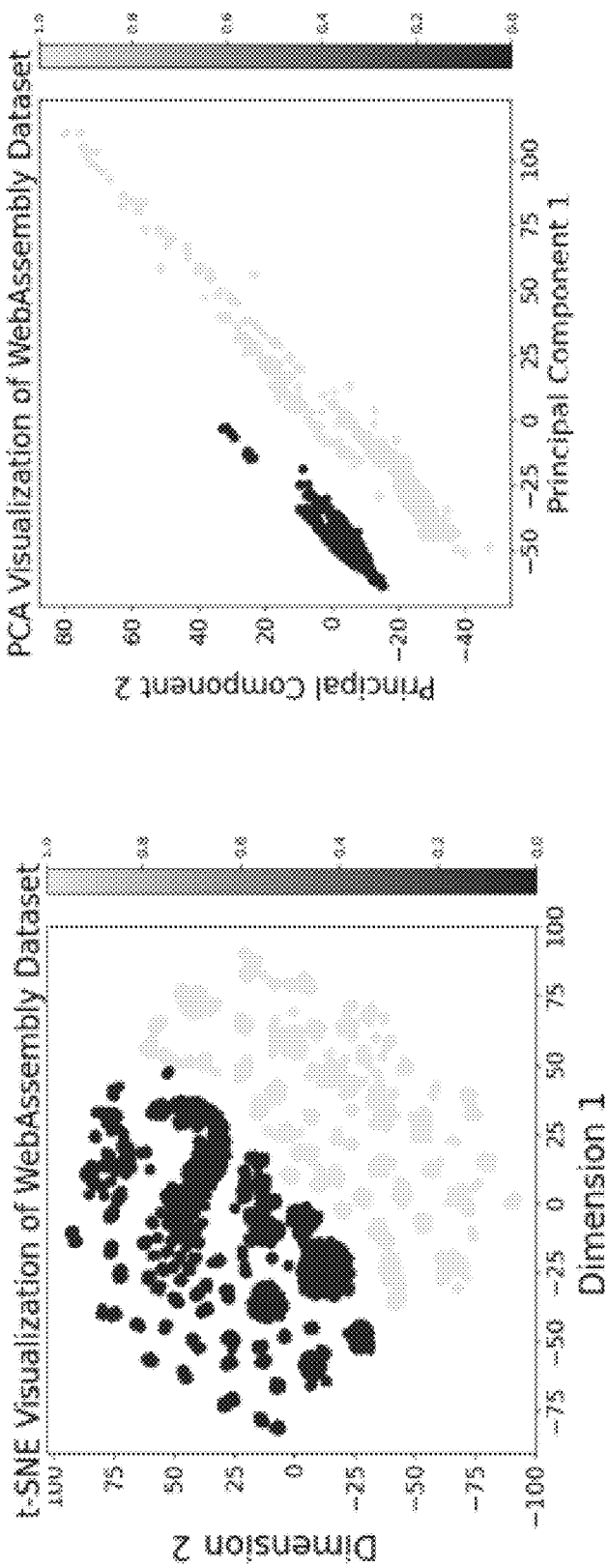
FIGS. 6(a)-6(c) show the dimensionality reduction of Wasm dataset in 2D using different visualization techniques.
Figure 6C:
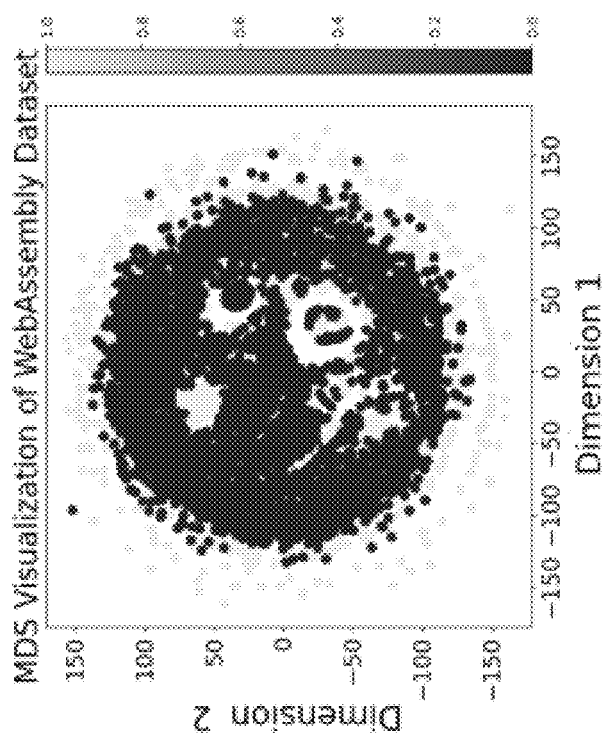

Given that WASMGUARD is configured to classify input data into two distinct classes (i.e., benign and malicious), each comprising both obfuscated and non-obfuscated samples, it is necessary to assess the influence of obfuscation techniques on each class. This includes analyzing the distribution and class separability within a reduced two-dimensional feature space. In this context, the projected training dataset is visualized, and its underlying structure is examined utilizing dimensionality reduction techniques. First, the t-distributed Stochastic Neighbor Embedding (t-SNE) is employed to reduce the dimensionality of the image data to two dimensions. Second, dimensionality reduction was performed utilizing Principal Component Analysis (PCA). Subsequently, Multidimensional Scaling (MDS) was utilized to reduce the dimensionality of the image data to a two-dimensional representation. For each dimensionality reduction technique, a scatter plot is generated, as illustrated in FIGS. 6(a)-(c), wherein each point is color-coded according to its respective class label.

According to the visualization results of t-SNE, PCA, and MDS, the benign and malicious datasets exhibit different distribution patterns. For the t-SNE visualization technique, FIG. 6(a) illustrates that the benign and malicious datasets are separated and dispersed. This infers that t-SNE is effective at capturing local similarities and preserving local structures. Consequently, it implies that the benign and malicious samples have distinct regions in the high-dimensional space. Irrespective of the obfuscation techniques applied, separability between benign and malicious samples is consistently achievable. With reference to the PCA visualization, as shown in FIG. 6(b), a distinct separation between the benign and malicious datasets is observed, wherein the data points form linear groupings. This implies that the main variation in the Wasm dataset aligns with specific directions or features, resulting in linear separation. Regarding the MDS visualization, FIG. 6(c) shows that the benign and malicious datasets appear on top of each other. This distribution demonstrates that the pairwise distances or dissimilarities between data points do not fully define the global structure or separability. In the present case, upon consideration of obfuscation techniques applied to both benign and malicious classes, it is not feasible to define a global structure predicated on pairwise distances.

Example 4

Figure 7A:
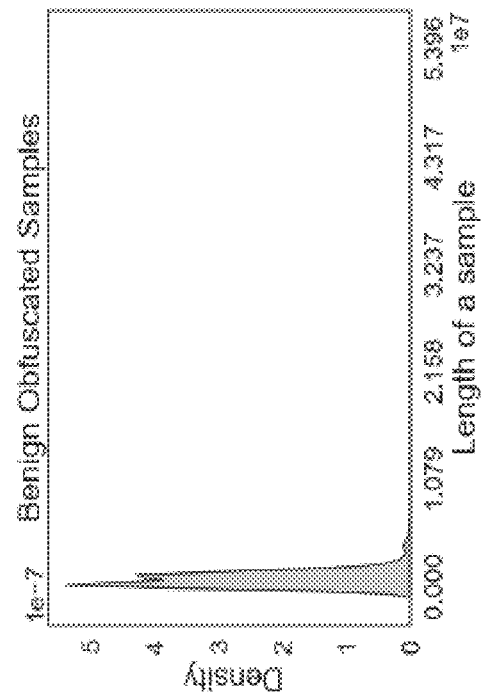
FIGS. 7(a)-7(d) show the distribution of bytecode length in Wasm dataset across multiple categories including a benign non-obfuscated binary code, a benign obfuscated binary code, a malicious non-obfuscated binary code, and a malicious obfuscated binary code.
Figure 7B:
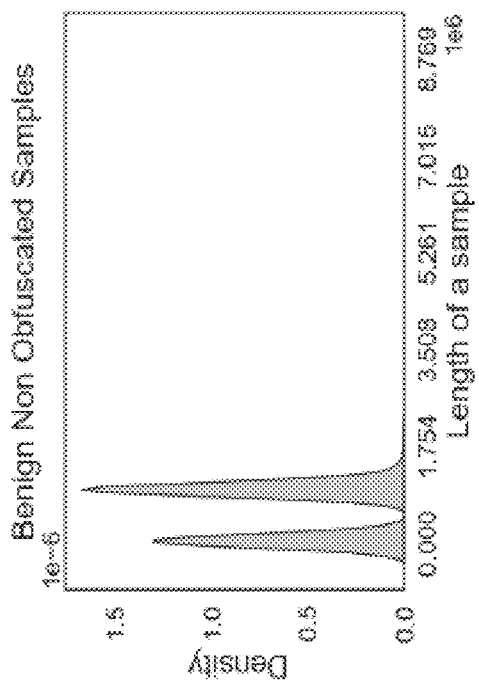
Figures 7C, 7D:
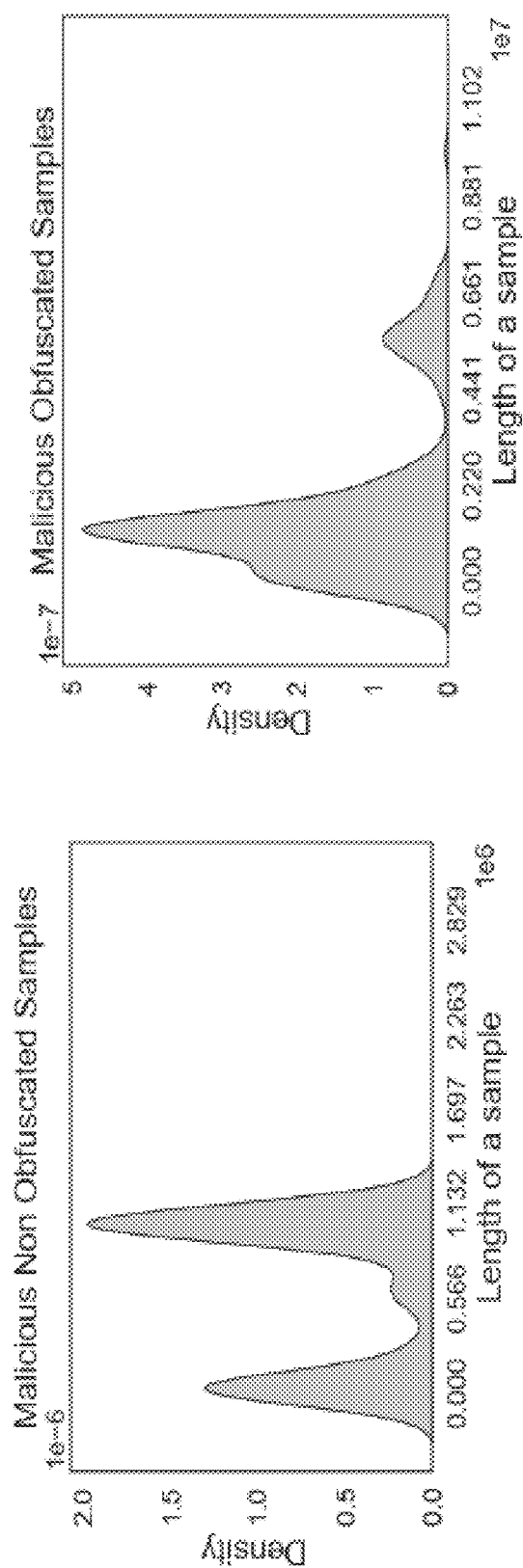

Additional experiments were conducted to analyze the distribution of bytecode lengths within the datasets, with the objective of understanding their representation across various categories. FIGS. 7(a)-(d) illustrate, for each category of the dataset applied in the described embodiments, the frequency distribution of samples based on bytecode size. To enable smooth visualization of the byte distribution within the dataset, a Kernel Density Estimation (KDE) plot was employed. According to the distribution of the bytecode length, it can be seen from FIG. 7(a) that the kernel density curve has two peaks with narrow bandwidths. These two major peaks can explain the two different types of source code considered, i.e., JavaScript, C, C++, or any combination thereof. However, when obfuscating the samples, FIG. 7(b) illustrates the merge of the two peaks into one, showing that the obfuscation techniques as described are successful. Correspondingly, for malicious non-obfuscated samples, two peaks are observed on the kernel density curve with a wider bandwidth in FIG. 7(c). The data distribution is broader compared to the benign non-obfuscated samples because, at the source code level, malicious code exhibits a degree of similarity (e.g., reusing the same portion of the malicious code in other functions). Thus, the kernel density estimation exhibits lower sensitivity to local variations. On the contrary, generating benign source code does not require reusing the same functions. For the malicious obfuscated samples, as shown in FIG. 7(d), the second peak of the curve is lower than the first due to the challenges faced in obtaining a significant number of malicious source code written in C, C++, or a combination thereof that can be compiled into Wasm. Therefore, notwithstanding the application of data augmentation techniques, the density curve corresponding to samples written in C, C++, or any combination thereof remains lower relative to that of the JavaScript samples.

Example 5

MINOS is configured as the only lightweight static Wasm-based malware meta-detector that utilizes deep learning techniques to identify malicious Wasm-based binaries. However, MINOS is specifically designed to target cryptojacking malware detection. To ensure a fair comparison, the MINOS model was re-implemented, and its preprocessing strategy was applied in accordance with its documented system design (since no open-source implementation was available). Following training of the classifier, a detection accuracy of 97.77% and F1 score of 93% were achieved. Subsequently, comparisons were conducted with respect to runtime overhead, dataset characteristics, and overall performance.

Runtime overhead comparison: With respect to the amount of RAM utilized by each detector, WASMGUARD usage is 5.2% during the preprocessing phase and 1.9% during the training phase, while MINOS utilizes 4.3% during preprocessing and 4.1% during training phase. WASMGUARD utilizes marginally greater memory during the preprocessing phase relative to MINOS, attributable to the number and size of the datasets considered. However, during the training phase, WASMGUARD exhibits substantially reduced memory consumption relative to MINOS. Regarding the size of RAM used by each detector, WASMGUARD utilizes more RAM during the pre-processing phase. However, WASMGUARD uses less memory during the training phase compared to MINOS. For the percentage of CPU, WASMGUARD CPU usage is 4.6% during preprocessing and 45.1% during training phase, while MINOS has 2% CPU usage during preprocessing and 52% during the training phase. WASMGUARD has a higher CPU consumption during the preprocessing phase, while MINOS has a slightly higher CPU usage during the training phase. For the execution time, WASMGUARD takes 10.426 seconds for the preprocessing and 445.749 seconds for the training phase. On the other hand, MINOS has only 0.497 seconds during the preprocessing and 24.8 seconds during the training phase.

Performance comparison: In FIG. 10, a comparison of performance metrics between WASMGUARD and MINOS is provided, including the corresponding percentage values. First, WASMGUARD achieves a detection accuracy of 98.79%, whereas MINOS can reach only 77.18%. WASMGUARD has a higher precision that reaches 98.15%, while MINOS has less than 57% precision. This means that WASMGUARD is more likely to predict positive samples compared to MINOS. Furthermore, the true positive rate of WASMGUARD is significantly higher compared to MINOS, with WASMGUARD achieving 99.41%, whereas MINOS exhibits a sensitivity of 12.44%. Therefore, for a larger size of the dataset, WASMGUARD can correctly classify malicious samples better than MINOS. Likewise, F1 score of WASMGUARD is approximately 98.77%, while MINOS has F1 score of 77.68%. For the true negative rate, MINOS slightly outperforms WASMGUARD, where it has a specificity of 59.89% in comparison to WASMGUARD with a specificity of 53.65%. Finally, MINOS has a lower negative predictive value compared to WASMGUARD, which are 89.68% and 99.49% respectively. The numerical results indicate that WASMGUARD outperforms across the majority of evaluated metrics, particularly accuracy, precision, and sensitivity, thereby demonstrating an enhanced capability to accurately detect malicious Wasm modules.

Example 6

To perform a fair comparison between WASMGUARD and other non-ML detectors, only testing samples not included in the training dataset were considered, consistent with an 80:20 training-testing split strategy. This approach ensures that the comparison between WASMGUARD and other non-ML detectors is conducted using datasets independent of the model. Following the application of a train-test split strategy on the dataset, four non-ML detectors were considered, namely ClamAV, Malwasm, MinerRay, MineSweeper, and VirusTotal, each of which is described below.

ClamAV: This is an open-source AV toolkit developed by Cisco Systems for detecting different types of malware, including trojans and viruses. ClamAV has several features, such as a multi-threaded scanner daemon, command line utilities for real-time file scanning, and automatic signature updates. At its core, ClamAV is an AV engine that has a bytecode signature runtime feature, which is supported by LLVM or a custom bytecode interpreter. In the experiments, the latest stable release version of ClamAV (1.1.0) was considered.

Malwasm: It is an offline command-line forensic tool for detecting malicious Wasm binaries. Malwasm extracts Wasm binaries from websites and subsequently disassembles them to generate detection rules based on various semantic profiling techniques. YARA, which stands for "Yet Another Recursive Acronym," is an open-source pattern-matching Swiss army knife that helps in detecting and classifying malicious software. YARA rules are essentially a set of instructions that define the characteristics of a specific type of malware or threat. YARA Rules were extensively collected from a plurality of distinct sources. The total number of all collected YARA rule files was 23,135. However, following validation via the yara-python library to identify potential syntax errors, a total of 19,439 valid YARA rule files were obtained. These rules are incorporated into Malwasm for the purpose of detecting malicious Wasm modules.

MinerRay: It is a static analysis framework that utilizes cross-language analysis via the Inter-Procedural Control Flow Graph to detect specific types of malicious Wasm binaries (i.e., cryptojacking). MinerRay converts JavaScript and asm.js code into Wasm modules. Then, these modules are translated via Intermediate Representation (IR), which helps to construct the Intra-Procedural Control Flow Graphs. MinerRay was re-implemented, and its detection performance was evaluated using the test dataset.

MineSweeper: It is a static detection system for Wasm-based cryptojacking malware. It consists of identifying cryptographic functions within Wasm binaries. MineSweeper comprises two variants: a first variant configured to detect the CryptoNight algorithm, commonly employed in cryptomining, and a second variant designed to identify cryptographic functions potentially utilized for cryptomining. Given that MineSweeper is open source, its detection mechanism was re-implemented and evaluated using the test dataset.

VirusTotal: It is one of the most popular online malware scanners and aggregates around 70 AV products. VirusTotal permits users to upload files through a web browser interface. Then, the file is automatically scanned to identify if it is benign or malicious. Afterward, VirusTotal provides a report regarding the file from each AV scanner. VirusTotal is widely used among security researchers, malware analysts, and industry practitioners. An academic public Application Programming Interface (API) key was requested from VirusTotal, and malicious samples were scanned locally via a Python script interfacing with the VirusTotal API.

FIG. 11 shows the detection time, the number of detected malicious samples for each detector, and consumption resource metrics along with WASMGUARD. Unexpectedly, ClamAV failed to detect the test samples despite encompassing a database of 8,671,682 known viruses. Moreover, ClamAV RAM usage increases significantly during the scanning process. This could be explained by the fact that ClamAV's malware detection engine loads around 2,039,787 malware signatures into memory, which is consuming significant computational resources when scanning a large number of files. During execution of Malwasm, a segmentation fault was encountered, attributable to the large volume of YARA rule files. To address this issue, batch processing was implemented by partitioning the YARA rule files into smaller batches, each comprising approximately 2,000 files. Subsequently, resource usage metrics, including CPU utilization, RAM usage, and memory size, were computed for each batch. Thereafter, the metrics were averaged across all batches to compute the total resource usage. Using this approach, comprehensive numerical values representing Malwasm's resource consumption during testing were obtained.

According to the reported results, Malwasm achieves a detection accuracy of 67.28%, with a significant detection time of 1,031.90 seconds. Additionally, it was observed that Malwasm performs memory-intensive operations, as evidenced by a high RAM usage of 7,236.95 megabytes (MB). MineRay does not consider obfuscation techniques that might be used by adversaries to bypass the detectors. Moreover, when dealing with a large number of samples, MinerRay necessitates an increased allocation of computational resources, which leads to extra processing time. Thus, making it impractical for environments with limited resources. MineSweeper detection relies on the number of operations to identify cryptographic hash functions. However, this technique is not efficient as it might trigger false positives. Although VirusTotal, the popular web-based AV solution has lower CPU and RAM usage compared to other detectors, it can correctly detect only 6% of the malicious samples, indicating a low classification rate of malicious Wasm modules. All experiments were conducted using identical hardware configurations to ensure a fair and consistent evaluation across the various detectors.

The experimental results underscore the effectiveness of WASMGUARD in detecting a significant portion of malicious samples, outperforming the other non-ML detectors in terms of detection time and detection rate. The experimental results indicate that WASMGUARD demonstrates the best overall performance. Indeed, in 3.78 seconds, WASMGUARD can detect around 832 samples, representing 97.53% portion of the malicious dataset. In comparison, Malwasm detected only 67.28% of the samples as malicious. Meanwhile, MinerRay and MineSweeper detected 613 and 640 malicious samples, respectively. However, VirusTotal detected only 6% of the malicious samples despite being a collective detection solution that covers more than 60 commercial AVs, while ClamAV completely fails to detect malicious samples.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for detecting malicious WebAssembly (Wasm) modules under source code obfuscation, the system comprising:
   a processor; and
   a machine-readable medium in operable communication with the processor and having instructions stored thereon that, when executed by the processor, perform the following steps:
   a) collecting source code written in a computer programming language that is designed for Wasm applications, the computer programming language comprising JavaScript, C, C++, or any combination thereof;
   b) categorizing the collected source code written in the computer programming language into a benign category and a malicious category based on predefined labeling criteria;
   c) preprocessing the benign and malicious source code written in the computer programming language to generate four distinct categories of binary code comprising: a benign non-obfuscated binary code, a benign obfuscated binary code, a malicious non-obfuscated binary code, and a malicious obfuscated binary code;
   d) constructing a balanced dataset by selecting a substantially equal number of samples from each of the four distinct binary code categories;
   e) splitting the balanced dataset into a training dataset, a validation dataset, and a test dataset using stratified sampling to preserve class proportions in each respective dataset;
   f) training a machine learning (ML) model using the training dataset, thereby generating a trained ML model configured to output a classification label indicative of whether input data is benign or malicious;
   g) selecting a model configuration comprising a hyperparameter set including at least one of a learning rate, a number of training epochs, and a batch size, the selected configuration yielding optimal performance when evaluated on the validation dataset;
   h) performing a final evaluation of the trained ML model using the test dataset;
   i) receiving a Wasm module within a browser environment of a user;
   j) applying the trained ML model to the received Wasm module to generate the classification label indicative of whether the received Wasm module is benign or malicious;
   k) triggering an alert mechanism responsive to a classification of the received Wasm module as malicious, the alert mechanism being configured to inform the user of the potential threat, the alert comprising information related to the malicious Wasm module and an origin identifier associated with a website corresponding to the malicious Wasm module; and
   l) relocating the malicious Wasm module into a secure isolation environment configured to inhibit the malicious Wasm module from interacting with the remainder of the browser environment.

2. The system according to claim 1, step c) comprising using the following components:
   (A) an obfuscator;
   (B) a converter; and
   (C) a validator.

3. The system according to claim 2, using component (A) comprising:
   (A1) receiving source code as input;
   (A2) performing semantic-preserving code transformations on the source code using a plurality of obfuscation techniques, the transformations being configured to retain the original semantics while increasing code complexity; and
   (A3) generating obfuscated source code as output.

4. The system according to claim 2, using component (B) comprising:
   (B1) receiving, as input, either the obfuscated source code processed by component (A), or the non-obfuscated source code obtained from step b);
   (B2) compiling the received source code into a Wasm module conforming to a Wasm specification; and
   (B3) outputting compiled Wasm module.

5. The system according to claim 2, using component (C) comprising:
- (C1) receiving the compiled Wasm module as input, and applying a validation algorithm in accordance with a Wasm specification;
- (C2) verifying that the compiled Wasm module is well-formed and conforms to structural and semantic rules defined by the Wasm language; and
- (C3) generating a validation result indicative of whether the compiled Wasm module is valid.

6. The system according to claim 1, step c) further comprising the sub-steps of:
- c1) applying an undersampling technique comprising random selection to the JavaScript source code to reduce the number of the JavaScript source code in overrepresented categories of dataset; and
- c2) applying an oversampling technique comprising data augmentation to the binary code compiled from C, C++, or a combination thereof to improve class balance within the dataset by increasing the representation of underrepresented categories.

7. The system according to claim 1, the ML model used in step f) comprising a Vision Transformer (ViT) model.

8. The system according to claim 1, the instructions, when executed, further performing the following steps, prior to step f):
- (i) converting each of the four distinct categories of binary code, each representing a Wasm module, into a corresponding image representation suitable for input into a ViT model;
- (ii) resizing the image representation of the binary code into a fixed resolution of 224×224 pixels;
- (iii) converting the resized image to a grayscale channel to reduce dimensional complexity and standardize input channels for subsequent processing; and
- (iv) replicating the grayscale channel three times to construct a three-channel image compatible with input requirements of the ViT model.

9. The system according to claim 1, the computer programming language source code used in step c), when malicious, comprising at least one of cryptominer malware or non-cryptominer malware, the non-cryptominer malware comprising at least one of trojans, downloaders, JavaScript-based ransomware, clickjackers, phishing scripts, or droppers, thereby enabling detection of multiple categories of malicious software.

10. The system according to claim 1, the system being an in-browser detector configured to analyze the Wasm modules in real time during web application execution and to classify the Wasm module as benign or malicious using static analysis prior to execution.

11. A method for detecting malicious WebAssembly (Wasm) modules under source code obfuscation, the method comprising:
- a) collecting source code written in a computer programming language that is designed for Wasm applications, the computer programming language comprising JavaScript, C, C++, or any combination thereof;
- b) categorizing the collected source code written in the computer programming language into a benign category and a malicious category based on predefined labeling criteria;
- c) preprocessing the benign and malicious source code written in the computer programming language to generate four distinct categories of binary code comprising: a benign non-obfuscated binary code, a benign obfuscated binary code, a malicious non-obfuscated binary code, and a malicious obfuscated binary code;
- d) constructing a balanced dataset by selecting a substantially equal number of samples from each of the four distinct binary code categories;
- e) splitting the balanced dataset into a training dataset, a validation dataset, and a test dataset using stratified sampling to preserve class proportions in each respective dataset;
- f) training a machine learning (ML) model using the training dataset, thereby generating a trained ML model configured to output a classification label indicative of whether input data is benign or malicious;
- g) selecting a model configuration comprising a hyperparameter set including at least one of a learning rate, a number of training epochs, and a batch size, the selected configuration yielding optimal performance when evaluated on the validation dataset;
- h) performing a final evaluation of the trained ML model using the test dataset;
- i) receiving a Wasm module within a browser environment of a user;
- j) applying the trained ML model to the received Wasm module to generate the classification label indicative of whether the received Wasm module is benign or malicious;
- k) triggering an alert mechanism responsive to a classification of the received Wasm module as malicious, the alert mechanism being configured to inform the user of the potential threat, the alert comprising information related to the malicious Wasm module and an origin identifier associated with a website corresponding the malicious Wasm module; and
- l) relocating the malicious Wasm module into a secure isolation environment configured to inhibit the malicious Wasm module from interacting with the remainder of the browser environment.

12. The method according to claim 11, step c) comprising using the following components:
- (A) an obfuscator;
- (B) a converter; and
- (C) a validator.

13. The method according to claim 12, using component (A) comprising:
- (A1) receiving source code as input;
- (A2) performing semantic-preserving code transformations on the source code using a plurality of obfuscation techniques, the transformations being configured to retain the original semantics while increasing code complexity; and
- (A3) generating obfuscated source code as output.

14. The method according to claim 12, using component (B) comprising:
- (B1) receiving, as input, either the obfuscated source code processed by component (A), or the non-obfuscated source code obtained from step b);
- (B2) compiling the received source code into a Wasm module conforming to a Wasm specification; and
- (B3) outputting compiled Wasm module.

15. The method according to claim 12, using component (C) comprising:
- (C1) receiving the compiled Wasm module as input; applying a validation algorithm in accordance with a Wasm specification;
- (C2) verifying that the compiled Wasm module is well-formed and conforms to structural and semantic rules defined by the Wasm language; and (C3) generating a validation result indicative of whether the compiled Wasm module is valid.

16. The method according to claim 11, step c) further comprising the sub-steps of:
   c1) applying an undersampling technique comprising random selection to the JavaScript source code to reduce the number of the JavaScript source code in overrepresented categories of dataset; and
   c2) applying an oversampling technique comprising data augmentation to the binary code compiled from C, C++, or a combination thereof to improve class balance within the dataset by increasing the representation of underrepresented categories.

17. The method according to claim 11, the ML model used in step f) comprising a Vision Transformer (ViT) model, and the method further comprising, prior to step f):
   (i) converting each of the four distinct categories of binary code, each representing a Wasm module, into corresponding image representation suitable for input into the VIT model;
   (ii) resizing the image representation of the binary code into a fixed resolution of 224×224 pixels;
   (iii) converting the resized image to a grayscale channel to reduce dimensional complexity and standardize input channels for subsequent processing; and
   (iv) replicating the grayscale channel three times to construct a three-channel image compatible with input requirements of the ViT model.

18. The method according to claim 11, the source code written in the computer programming language used in step c), when malicious, comprising at least one of cryptominer malware or non-cryptominer malware, the non-cryptominer malware comprising at least one of trojans, downloaders, JavaScript-based ransomware, clickjackers, phishing scripts, or droppers, thereby enabling detection of multiple categories of malicious software.

19. The method according to claim 11, the method utilizing an in-browser detector configured to analyze the Wasm modules in real time during web application execution and to classify the Wasm module as benign or malicious using static analysis prior to execution.

20. A system for detecting malicious WebAssembly (Wasm) modules under source code obfuscation, the system comprising:
   a processor; and
   a machine-readable medium in operable communication with the processor and having instructions stored thereon that, when executed by the processor, perform the following steps:
   a) collecting source code written in a computer programming language that is designed for Wasm applications, the computer programming language comprising JavaScript, C, C++, or any combination thereof;
   b) categorizing the collected source code written in the computer programming language into a benign category and a malicious category based on predefined labeling criteria;
   c) preprocessing the benign and malicious source code written in the computer programming language to generate four distinct categories of binary code comprising: a benign non-obfuscated binary code, a benign obfuscated binary code, a malicious non-obfuscated binary code, and a malicious obfuscated binary code;
   d) constructing a balanced dataset by selecting a substantially equal number of samples from each of the four distinct binary code categories;
   e) splitting the balanced dataset into a training dataset, a validation dataset, and a test dataset using stratified sampling to preserve class proportions in each respective dataset;
   f) training a machine learning (ML) model using the training dataset, thereby generating a trained ML model configured to output a classification label indicative of whether input data is benign or malicious;
   g) selecting a model configuration comprising a hyperparameter set including at least one of a learning rate, a number of training epochs, and a batch size, the selected configuration yielding optimal performance when evaluated on the validation dataset;
   h) performing a final evaluation of the trained ML model using the test dataset;
   i) receiving a Wasm module within a browser environment of a user;
   j) applying the trained ML model to the received Wasm module to generate the classification label indicative of whether the received Wasm module is benign or malicious;
   k) triggering an alert mechanism responsive to a classification of the received Wasm module as malicious, the alert mechanism being configured to inform the user of the potential threat, the alert comprising information related to the malicious Wasm module and an origin identifier associated with a website corresponding to the malicious Wasm module; and
   l) relocating the malicious Wasm module into a secure isolation environment configured to inhibit the malicious Wasm module from interacting with the remainder of the browser environment,
   step c) comprising using the following components:
   (A) an obfuscator;
   (B) a converter; and
   (C) a validator,
   using component (A) comprising:
   (A1) receiving source code as input;
   (A2) performing semantic-preserving code transformations on the source code using a plurality of obfuscation techniques, the transformations being configured to retain the original semantics while increasing code complexity; and
   (A3) generating obfuscated source code as output,
   using component (B) comprising:
   (B1) receiving, as input, either the obfuscated source code processed by component (A), or the non-obfuscated source code obtained from step b);
   (B2) compiling the received source code into a Wasm module conforming to a Wasm specification; and
   (B3) outputting compiled Wasm module,
   using component (C) comprising:
   (C1) receiving the compiled Wasm module as input; applying a validation algorithm in accordance with the Wasm specification;
   (C2) verifying that the compiled Wasm module is well-formed and conforms to structural and semantic rules defined by the Wasm language; and
   (C3) generating a validation result indicative of whether the compiled Wasm module is valid,
   step c) further comprising the sub-steps of:
   c1) applying an undersampling technique comprising random selection to the JavaScript source code to reduce the number of the JavaScript source code in overrepresented categories of dataset; and
   c2) applying an oversampling technique comprising data augmentation to the binary code compiled from C, C++, or a combination thereof to improve class balance within the dataset by increasing the representation of underrepresented categories, the ML model used in step f) comprising a Vision Transformer (ViT) model, the instructions when executed further performing the following steps, prior to step f):
  (i) converting each of the four distinct categories of binary code, each representing a Wasm module, into corresponding image representation suitable for input into the VIT model;
  (ii) resizing the image representation of the binary code into a fixed resolution of 224×224 pixels;
  (iii) converting the resized image to a grayscale channel to reduce dimensional complexity and standardize input channels for subsequent processing; and
  (iv) replicating the grayscale channel three times to construct a three-channel image compatible with input requirements of the ViT model, the source code written in the computer programming language used in step c), when malicious comprising at least one of cryptominer malware or non-cryptominer malware, the non-cryptominer malware comprising at least one of trojans, downloaders, JavaScript-based ransomware, clickjackers, phishing scripts, or droppers, thereby enabling detection of multiple categories of malicious software, and the system being an in-browser detector configured to analyze the Wasm modules in real time during web application execution and to classify the Wasm module as benign or malicious using static analysis prior to execution.

* * * * *